UNITED STATES PATENT OFFICE.

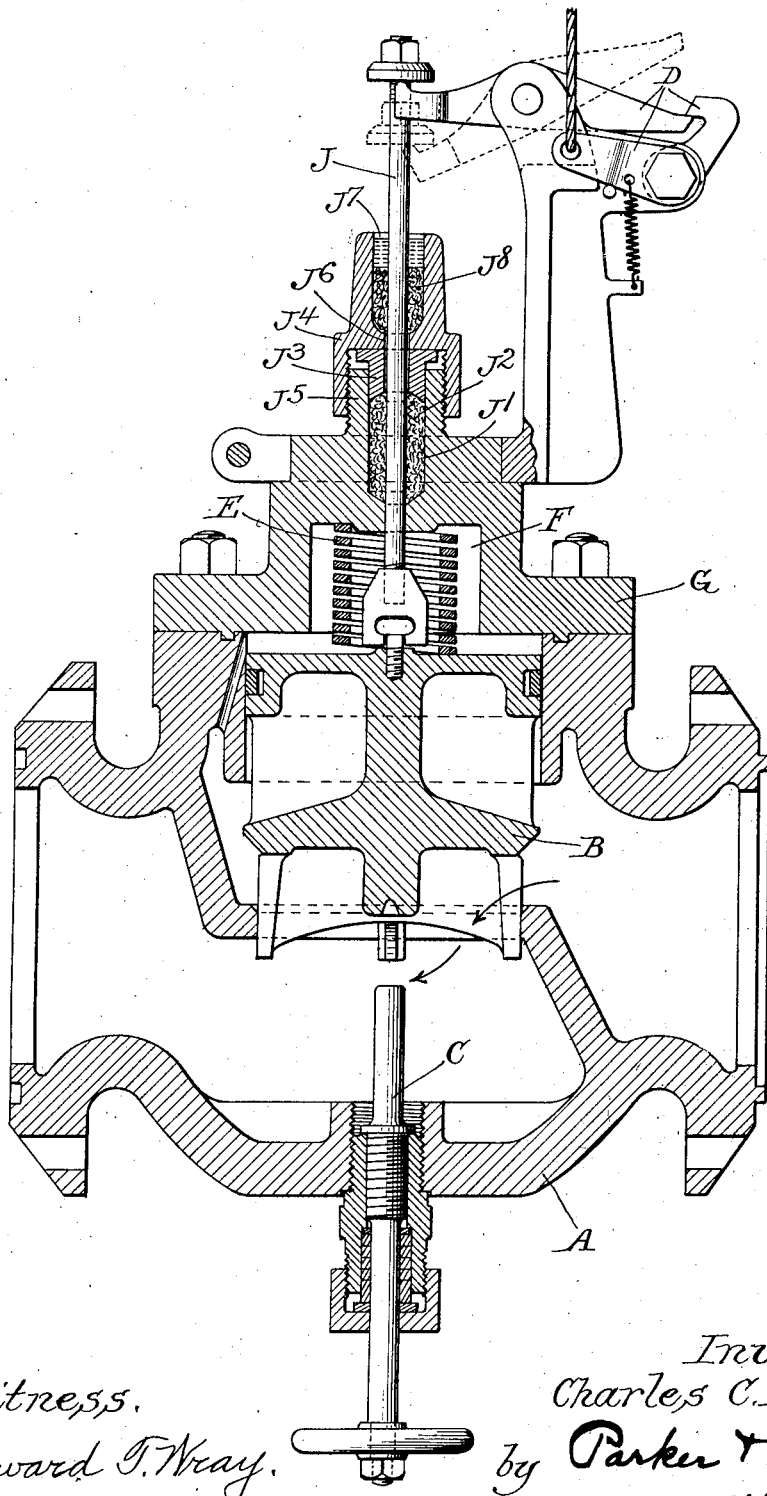

CHARLES C. HANSEN, OF CHICAGO, ILLINOIS, ASSIGNOR TO REFRIGERATING SPECIALTIES COMPANY, OF CHICAGO, ILLINOIS, A CORPORATION OF ILLINOIS.

VALVE-STEM PACKING.

1,391,317.  Specification of Letters Patent.  Patented Sept. 20, 1921.

Application filed August 12, 1918. Serial No. 249,461.

*To all whom it may concern:*

Be it known that I, CHARLES C. HANSEN, a citizen of the United States, residing at Chicago, in the county of Cook and State of Illinois, have invented a certain new and useful Improvement in Valve-Stem Packings, of which the following is a specification.

My invention relates to packing and securing means for the stems of valves which are infrequently moved, such as automatic safety release valves, for refrigerating systems, and has for its object to provide among other things, means whereby such valve stem, though at rest for long periods and exposed to the corrosive action of the atmosphere or gases, will nevertheless be in condition for instant action whenever called upon to move.

One illustration of my invention is shown in connection with such a valve in the accompanying drawing.

A is a valve body with the valve B which controls the passage of fluid through the body.

C is a hand operated device adapted to raise the valve from its seat, and if desired, to hold it off its seat. This structure forms no part of the present invention.

D is a device comprising a series of members adapted to hold the valve in its upward position but to be released when the moment arrives for the valve to descend. This structure also is no part of the present invention.

E is a spring preferably in a pocket F in the valve cover G and adapted to bear on the top of the valve and to hold the valve on its seat.

J is the valve stem which passes through a hole in the valve cover G. The valve stem makes a bearing fit in this hole. $J^1$ is a deep pocket in the upper part of the valve cover, and it is filled with packing material $J^2$. This may be any kind of metallic fibrous or other packing of a nature to hold lubricant and to be compressed about the stem. $J^3$ is a plug which fits in the upper part of the hole to form the gland. $J^4$ is a cap screw-threaded into the upward projection $J^5$ on the cover of the valve and adapted when rotated to compress the packing in the gland. $J^6$ is an aperture through this cap and the plug of the gland leading into the pocket $J^7$ in the cap. The hole $J^6$ is of such diameter as to leave a slight clearance between it and the stem so as to permit lubricant to pass by gravity down along the stem from the pocket $J^7$ to the gland. The size of this annular passage about the stem is such as to permit a sufficient amount of lubricant to follow down the stem to keep the lower packing supplied with lubricant. Of course this hole could be such as to produce a bearing fit between the hole and the stem in which event some other passageway perhaps a minute hole near the stem could be made to connect the two pockets. This, of course, is obviously not a desirable form of construction. The pocket $J^7$ is provided with a loose lubricant bearing mass $J^8$. This mass is preferably of a depth slightly greater than the excursion of the valve stem and the pocket $J^7$ is supplied with lubricant. The object is to keep the effective level of the lubricant in the pocket $J^7$ at a depth approximately equal to the length of the excursion of the stem.

These stems are usually made of iron or steel or at least not of brass for the latter metal is liable of corrosion on account of exposure to the ammonia.

It will be understood that I have shown my invention here in one of many forms that might be used, but what is here shown illustrates its essential features.

The use and operation of my invention are as follows:—

Assuming that we are dealing with a valve which is connected with the ammonia system of a refrigerating plant, and that the valve is open, the ammonia of course would circulate within the valve and up to and about the valve stem at the point where it projects from the valve cover.

The ammonia should not be allowed to escape along the valve stem into the apartment. The first desirable means for minimizing such tendency is to make the hole in the cover of the valve of such proportions that they will make a bearing fit. The next desirable means is to have a long packing capable of being put under pressure and carrying lubricant, and for this I provide by the gland as shown.

If the packing in the gland is kept supplied with lubricant, it will not be necessary to further compress it, for it will be kept flexible by the lubricant. This packing is intended to prevent the passage of ammonia up along the stem. Lubricant is supplied to the packing to prevent it from drying.

In the old forms of such devices when the ammonia begins to escape due to the drying out of such packing as may have been employed, the operator commonly compresses the packing with the result that in the end it is so tightly compressed, especially when it is dried out, around and against the stem that the latter will not move responsive to the spring.

Since the valve stem in the ordinary operation of such devices remains frequently for long periods in its open position and at rest, the great danger is that the valve stem will become corroded by the action of the atmosphere or the gases which it may contain and will then fail to respond to the spring or to move into its closed position. The exposed upper portion of the valve stem will corrode. The means for minimizing the danger due to this corrosion is a lubricant chamber about the upper part of the stem carrying a body of lubricant deeper than the length of the excursion so that that part of the stem which moves through the opening in the valve parts will be always covered by lubricant. To make sure that such portion of the stem will be so covered by lubricant, I employ the lubricant bearing mass which is itself deeper than the length of the excursion and fits around the stem in such way as to hold lubricant thereabout even when the level of the fluid lubricant would be lower than the top of such mass, or a point where if not associated with such capillary mass its depth would be less than the excursion of the stem.

The upper pocket or chamber, therefore, performs two functions: It keeps that part of the stem which reciprocates through the hole or opening below always in a lubricating bath and it furnishes a constant supply of lubricant to the gland below.

The stem is held in alinement by the bearing fit, the gland packing and the oil annulus.

The lower chamber with its packing prevents the upward movement of the ammonia along the stem.

I claim:—

1. The combination with a stem mounted for vertical reciprocation but normally at rest of two lubricant chambers about said stem and one above the other, a passage connecting them adapted to allow lubricant to flow from the upper chamber to the lower irrespective of the movement of said stem and packing in them in contact with said stem, the upper chamber provided with an opening for the introduction of lubricant, the depth of packing in the upper chamber being as great as the excursion of the stem.

2. The combination with a stem mounted for reciprocation but normally at rest of two lubricant chambers about said stem and one above the other, a passage connecting them adapted to allow lubricant to flow from the upper chamber to the lower irrespective of the movement of said stem and packing in them, in contact with said stem, the upper chamber provided with an opening for the introduction of lubricant the depth of packing in the upper chamber being substantially as great as the excursion of the stem.

3. The combination with a valve stem mounted for vertical reciprocation but normally at rest of two lubricant chambers about said stem and one above the other, a passage connecting them through which lubricant passes from the upper chamber to the lower one irrespective of the movement of said stem, and packing in them in contact with said stem, the upper chamber open at its top, the depth of lubricant and packing in the upper chamber being as great as the excursion of the valve stem.

4. The combination with a valve stem mounted for vertical reciprocation but normally at rest of two lubricant chambers about said stem, and one above the other, a passage connecting them through which lubricant passes from the upper chamber to the lower one irrespective of the movement of said stem, and packing in them in contact with said stem, the upper chamber open at its top, the depth of lubricant and packing in the upper chamber being as great as the excursion of the valve stem, together with means for varying the pressure of the packing in the lower chamber.

5. The combination with a stem mounted for vertical reciprocation but normally at rest of two lubricant chambers about said stem one above the other, a passage connecting them adapted to allow lubricant to flow from the upper chamber to the lower irrespective of the movement of said stem and lubricant in them in contact with said shaft, the upper chamber provided with an opening for the introduction of lubricant the depth of the lubricant in the upper chamber being substantially as great as the excursion of the stem.

In testimony whereof I affix my signature in the presence of two witnesses this 3d day of August, 1918.

CHARLES C. HANSEN.

Witnesses:
MINNIE M. LINDENAU,
LAUREL D. MEYER.